March 29, 1966  H. J. GOLDMAN  3,243,793
PROCEDURE AND APPARATUS FOR NUCLEAR
DETECTION-ANALYSIS FOR USE ON ROAD
SURFACES AND THE LIKE
Filed March 23, 1962  3 Sheets-Sheet 1
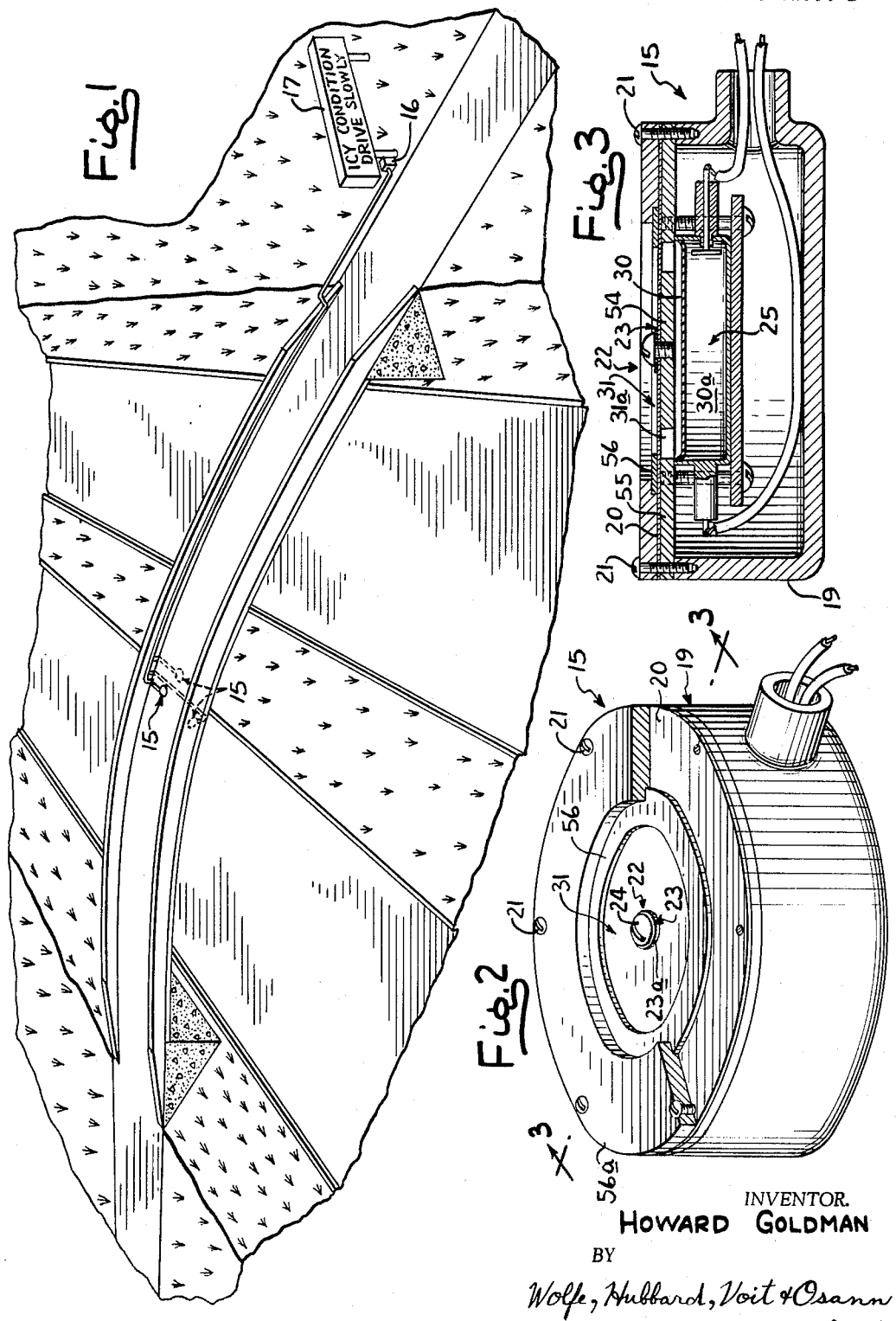
INVENTOR.
HOWARD GOLDMAN
BY
Wolfe, Hubbard, Voit & Osann
ATTYS.

March 29, 1966
H. J. GOLDMAN
3,243,793
PROCEDURE AND APPARATUS FOR NUCLEAR
DETECTION-ANALYSIS FOR USE ON ROAD
SURFACES AND THE LIKE
Filed March 23, 1962
3 Sheets-Sheet 2
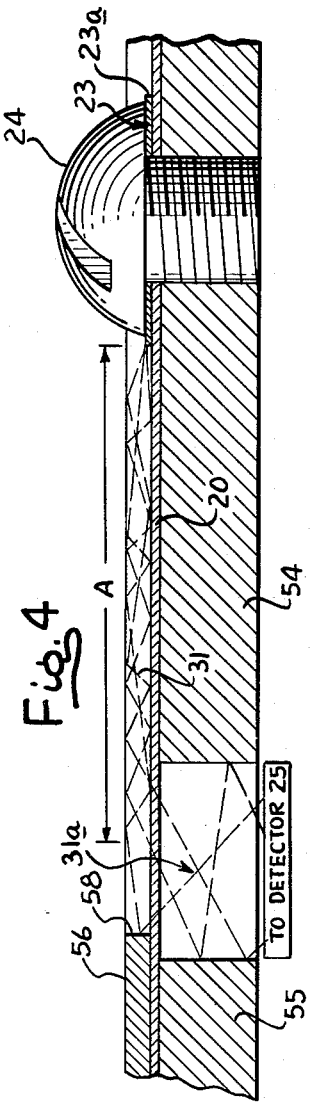
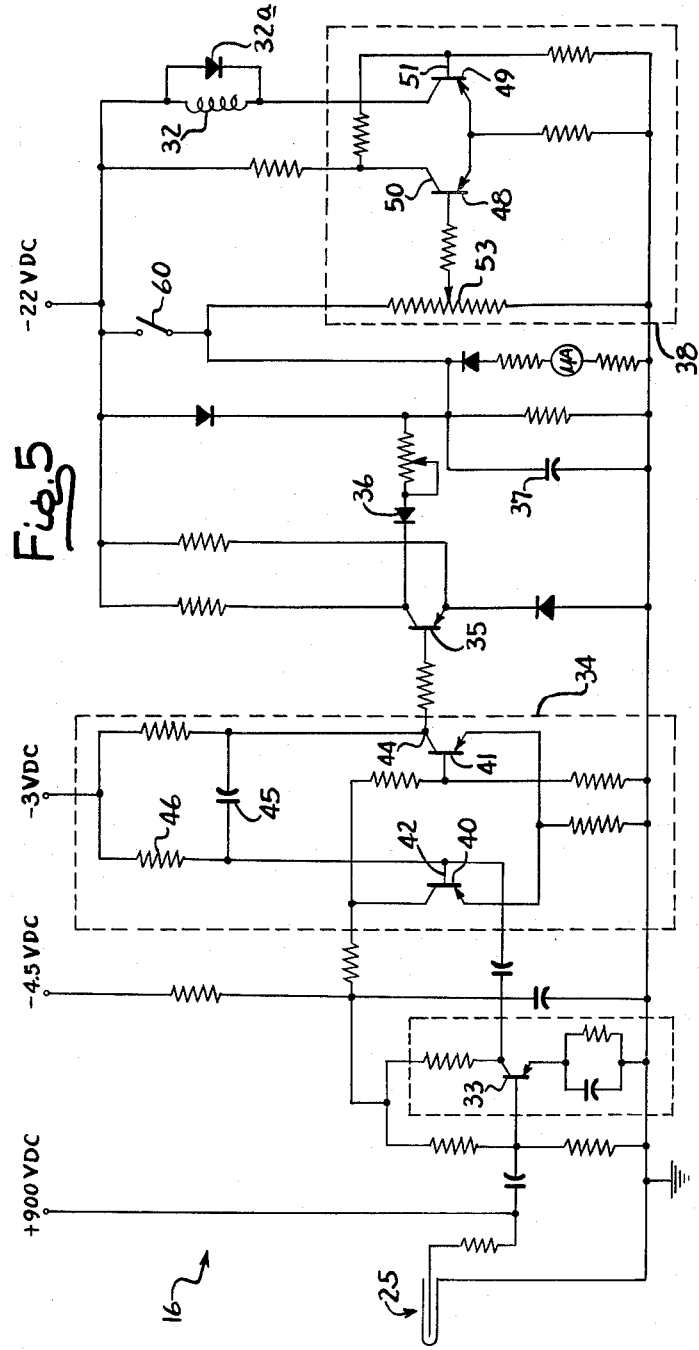
INVENTOR.
HOWARD GOLDMAN
BY
Wolfe, Hubbard, Voit & Osann
ATTYS.

March 29, 1966
H. J. GOLDMAN
3,243,793
PROCEDURE AND APPARATUS FOR NUCLEAR
DETECTION-ANALYSIS FOR USE ON ROAD
SURFACES AND THE LIKE
Filed March 23, 1962
3 Sheets-Sheet 3
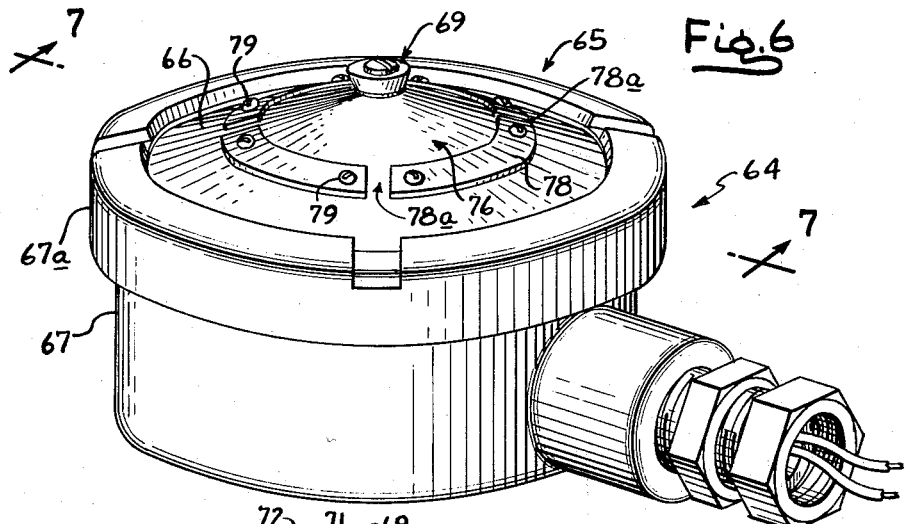
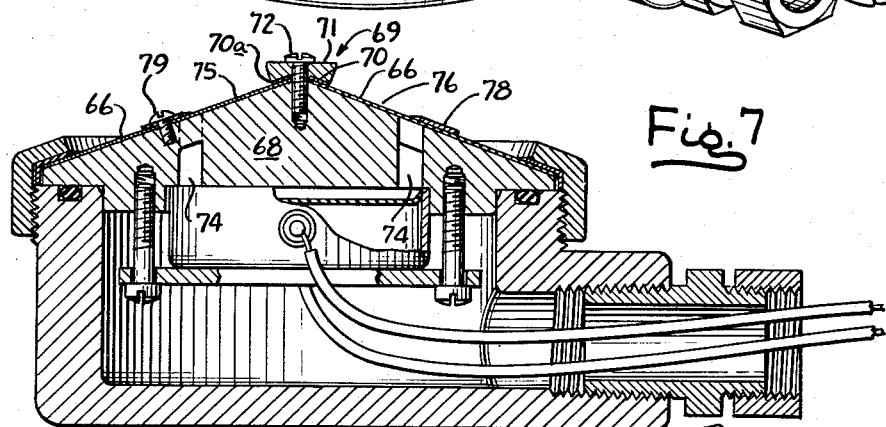
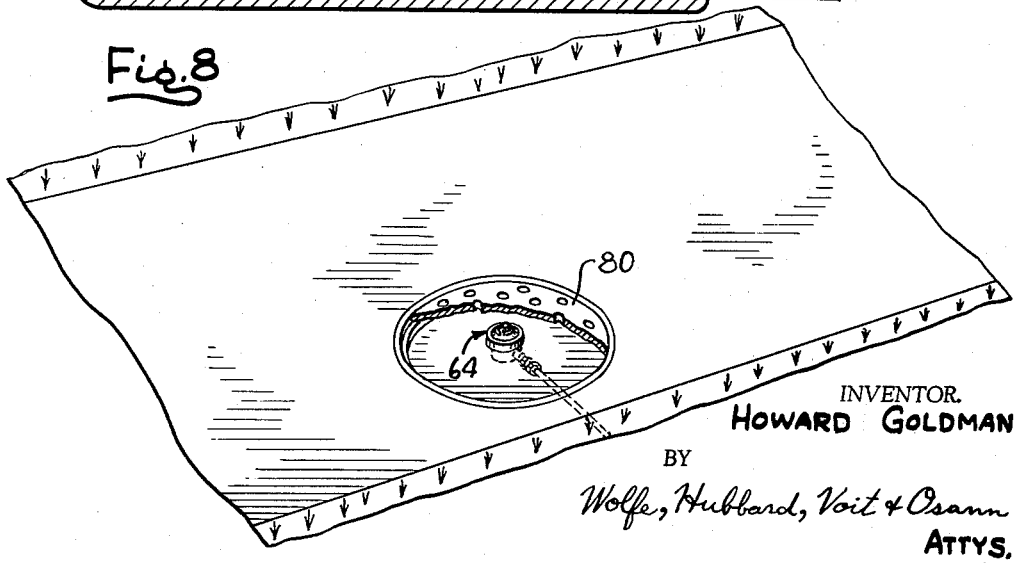
INVENTOR.
HOWARD GOLDMAN
BY
Wolfe, Hubbard, Voit & Osann
ATTYS.

United States Patent Office 3,243,793
Patented Mar. 29, 1966

3,243,793
PROCEDURE AND APPARATUS FOR NUCLEAR DETECTION-ANALYSIS FOR USE ON ROAD SURFACES AND THE LIKE
Howard J. Goldman, 35 Wilmette Ave., Glenview, Ill.
Filed Mar. 23, 1962, Ser. No. 181,989
5 Claims. (Cl. 340—234)

This invention relates in general to a method and an apparatus for detecting ice and the like utilizing nuclear particles, and in particular such a method and an apparatus for detecting ice and the like by sensing the nuclear particle absorbing and deflecting properties of such materials.

A dangerous driving condition present with today's high-speed use of super highways is the isolated "slippery spot" on the roadway arising from rain, ice, frost, and the like. Reliable yet inexpenisve devices which can withstand rugged road wear and serve as advance indicators of road conditions to approaching motorists are needed. Since a relatively thin film or layer of material is all that is necessary to reduce roadway traction, the device used must be able to sense a thin film or layer of material which hugs the surface upon which it is deposited.

There are other applications in which it is desirable to detect thin films or layers of material, for example such an instrument is desirable to sense icing of helicopter blades and airfoil surfaces.

It is an object of the present invention to indicate the condition of a highway, a landing strip, a helicopter propeller blade, an airplane wing, or any other surface by sensing thin layers or films of rain, sleet, snow, frost, ice and the like.

It is a further object of the present invention to provide a sensing instrument of the nuclear type adapted to indicate a thin film or layer of nuclear particle absorbing and deflecting material in a predetermined space, yet maintaining the radioactivity at a safe level, for eyample in the range of five milliroentgens per hour or less at a distance of six inches from the device which is well below the safe limits of permissible radiation.

More particularly, it is an object of the present invention to provide a highly sensitive device which utilizes beta particles to detect a thin film or layer of specific beta particle absorbing and deflecting materials which are difficult to detect because they hug the surface and form a thin layer, yet the device has a long life by virture of its inherently durable construction and its lack of moving parts.

It is an overall object of the present invention in accordance with the above to provide a sensing instrument of the nuclear type which sensitively detects the presence of material in a predetermined space or on a predetermined surface, but which is economical to construct and easy to maintain.

Other objects and advantages of the invention will become apparent upon reading the following detailed description and upon reference to the drawings in which:

FIGURE 1 is a diagrammatic pictorial view showing a sensing head constructed in accordance with the present invention placed along a roadway to warn motorists of an icy condition on the road ahead.

FIG. 2 is an enlarged pictoral view of the sensing head constructed in accordance with the present invention;

FIG. 3 is a section substantially along a plane 3—3 in FIG. 2;

FIG. 4 is an enlarged fragmentary section showing the surface of the sensing head;

FIG. 5 is a schematic of the circuit responding to the sensing head output for operating a relay;

FIG. 6 is an alternative embodiment of a sensing head constructed in accordance with the present invention;

FIG. 7 is a section taken substantially along a plane 7—7 in FIG. 6; and

FIG. 8 is a diagrammatical pictorial view of a sensing head placed in a roadway or the like with a section of a cover removed.

While the invention will be described in connection with a preferred method and embodiment, it will be understood that I do not intend to limit the invention to that method and embodiment. On the contrary, I intend to cover all alternatives, modifications and equivalents as may be included within the spirit and scope of the invention as defined by the appended claims.

Referring more particularly to the drawings, FIG. 1 is a diagrammatic pictorial view illustrative of the practice of the present invention. While details are brought out in the following description and accompanying figures, it is possible to visualize from FIG. 1 how the nuclear sensing head 15 operates to warn an approaching motorist of the road condition ahead. The sensing head 15, which can for example detect ice, provides a signal for actuating a circuit 16 which operates a sign 17. The sensing head 15 is so placed that it represents a portion of the roadway surface. Thus, whatever occurs on the road surface also occurs at the sensing head. The sensing head can be placed in the traveled part of the roadway, in the middle of the roadway or out of the roadway on the side.

Referring more particularly to FIG. 2 where the sensing head 15 is shown in detail, the latter has a cup-shaped outer casing 19 constructed of suitable material such as die cast metal, with a top cover plate 20. The plate 20 is fastened to the casing 19 by a plurality of screws 21. Though the casing is preferably constructed in a cylindrical shape, other suitable shapes can be utilized with the object of providing a compact sensing head which can be embedded in a roadway, an airplane wing or the like to sense conditions on a representative portion of the surface thereof.

Centrally located atop the cover plate 20 is a source of nuclear particles 22. In the present instance this source 22 takes the form of a washer 23 held by a screw 24 and which has a peripheral surface 23a painted with radioactive material, for example, strontium 90 suspended in an epoxy resin. Understandably, other radioactive materials may be used, the requirements being long radioactive life and ample nuclear particle emission. Nuclear particle transmission ranges in the atmosphere increase respectively with alpha, beta and gamma radiation. In the range of present interest, one to twelve inches, beta radiation is suitable.

As shown in FIG. 3, for detecting nuclear particles a detector 25 is supported below coverplate 20. In the present instance the detector is a pancake-shaped ionization chamber commonly referred to as a Geiger-Mueller or G-M tube. In contrast to G-M tubes of long cylindrical shape, the present tube is flat and more compact. The tube shape is particularly adapted for use with flat surfaces, roadways and the like. Beta particles enter the tube through an input face 30, constructed of suitable material such as mica. This causes an avalanche of ionization within the chamber 30a which effectuates a current pulse between the plate and cathode of the tube. For one type of G-M tube used with the present invention, a pulse occurs for each entering beta particle as long as the particle energy is above 25,000 electron volts and the frequency of the particles is less than about one every hundred microseconds. Understandably, more refined detectors can be used with pulse outputs responsive to both the number of particles and the energy of the particles. Also solid state detectors can be used instead of the G-M tube. As will be explained in detail subsequently the nuclear particles are detected after traveling through a predetermined space 31 between the source 22 and an input window 31a.

Turning to FIG. 5, there shown is a schematic of the circuit 16 responsive to the pulse output of G-M tube 25 for selectively energizing a relay 32 to turn on and off the sign 17. Explaining generally the operation of circuit 16, the pulse output of G-M tube 25 is amplified by a transistor 33 employed to trigger a monostable multivibrator 34. The uniform pulse output of multivibrator 34 is amplified by a transistor 35 and rectified by a diode 36. The D.-C. signal charges a capacitor 37 operatively coupled to a Schmitt trigger circuit 38. Trigger circuit 38 operates relay 32 upon the D.-C. signal falling below a predetermined level in response to absorption and deflection of beta particles at sensing head 15.

Explaining the operation of circuit 16 in further detail, the G-M tube output pulses are first amplified by transistor 33. The monostable multivibrator 34 suppresses any variations in the amplitude of the G-M tube pulses by producing a uniform output pulse for each input pulse regardless of amplitude. The necessity for uniform pulses will be appreciated by remembering that the Schmitt trigger circuit is to respond to the number of beta particles and not to the energies of the particles; thus the D.-C. signal level at the Schmitt circuit must be proportional only to the number of pulses. To this end, the multivibrator includes a transistor 40 normally conductive and a transistor 41 normally non-conductive coupled for monostable multivibrator operation. A pulse input appears at a base 42 of normally conductive transistor 40. The pulse input biases transistor 40 against conduction, whereupon the transistor 41 is biased to conduction. The potential at collector 44 of the now conducting transistor 41 increases to a level fixed by the current gain of transistor 41 and remains at the level until a capacitor 45 discharges through a resistor 46. Upon discharge of capacitor 45 the first transistor is biased for conduction again and the transsitor 41 is again normally non-conductive. The potential at collector 44 drops and the output pulse from the multivibrator is complete.

The transistor 35 amplifies the output pulse of the multivibrator 34 and feeds it into the diode 36. The D.-C. signal is proportional to the number of beta particles that enter G-M tube 25. Relay 32 is energized by the Schmitt trigger circuit 37 in response to a reduction in the number of beta particles, i.e., to a reduction in the D.-C. signal. Explaining operation of the Schmitt circuit, it includes a pair of transistors 48, 49 having a common emitter circuit and a collector 50 of the transistor 48 coupled to a base 51 of the transistor 49. Transistor 48 is normally conductive when the capacitor 37 is sufficiently charged by the output of diode 36. With the first transistor 48 conducting heavily, its collector-emitter voltage will be low, a small fraction of a volt. The low voltage is coupled across the emitter-base of the second transistor 49 to bias the latter against conduction. A reduction in the D.-C. signal decreases the charge on capacitor 37 thereby biasing the first transistor 48 so that it is less conductive. The emitter-collector voltage across the first transistor 48 thereby increases and is of proper polarity to make base 51 negative with respect to the emitter of the second transistor, whereupon the second transistor 49 conducts. Since relay 32 is connected in the output circuit of the second transistor 48, the relay is energized. A Zener diode 32a is connected in parallel with relay 32 to regulate the voltage across the relay. The triggering level of the Schmitt circuit is adjusted with a potentiometer 53.

The following explanation of beta particle behaviour is recited to aid in the understanding of the present invention. As is well know in the art, beta particles are electrons having differing energies and accordingly differing velocities. Due to the relatively small mass of electrons (about $\frac{1}{7000}$ that of an $\alpha$ particle) they can be very easily scattered. Scattering and loss of a large fraction of energy and momentum result when beta particles collide with other electrons or fields associated with atomic particles. Beta particles therefore are frequently deflected from their course and pursue in general a tortuous path in their passage through matter. This has been generally shown in FIG. 4. From the foregoing explanation it is clear that the pattern traced by an specific beta particle will depend upon both the matter the beta particle has to penetrate and also upon the energy the particle has as it leaves the radiating source. In general, the heavier the material through which the beta particles must travel and the longer the travel path is for the beta particles, the greater is the opportunity for the beta particles to be deflected and to lose energy.

The energy of the beta particles depends upon the specific radioactive element which is transforming and thereby emitting the particles. In the exemplary embodiments strontium 90 produces beta particles having a continuous energy distribution with maximum particle energy being about 0.56 million electron volts. Yttrium 90 is produced in the disintegration of strontium 90 and contributes beta particles also. Beta particles from yttrium 90 have a continuous energy distribution with a maximum particle energy of about 2 million electron volts. Radioactive elements emitting nucelar particles with these approximate energy distributions are preferably employed in the present invention.

In accordance with the present invention thin layers of ice and the like present in the predetermined space 31 are detected and analyzed by radiating nuclear particles through the space 31 and sensing the variations in the number of particles or in the energies of the particles. As practiced in the present instance, beta particles radiate from the strontium 90 source 22 and are primarily directed through thin layer space 31 toward the sensing head input window 31a. For defining a longitudinal lower boundary for space 31, sandwiched against the underside of the cover plate 20, is a disk 54 constructed of suitable shielding material, for example, lead or tungsten alloys which backscatters a substantial number of beta particles and does not allow them to penetrate. The upper boundary of space 31 is not so clearly defined, but can be fixed generally by orientation of the radiating face 23a of source 22. In the present embodiment the radiating surface 23a is substantially perpendicular to the coverplate 20. In this preferred construction the major portion of the radiated beta particles will travel substantially horizontally through a space having a cross-section dimension about three to six times the height of surface 23a. If the surface 23a is inclined and beta particles are thereby radiated upward, the space 31 will extend further above coverplate 20 and have a larger cross-section dimension. Normally air molecules provide the upper boundary for space 31.

The outside perimeter of space 31 is defined by the annular beta particle input window 31a disposed a predetermined distance A from source 22. The distance A will depend upon the energies of the beta particles leaving the source 22 as well as the energies required of the beta particles to actuate detector 25. In a preferred construction, a strontium 90 source gave the desired pulse outputs by setting the distance A at about three-quarters of an inch. As best shown in FIG. 3, the disk 54 does not extend so as to fully shield the G-M tube input face 30, but instead leaves the annular input window 31a for beta particles to enter G-M tube 25. The outside circumference of window 31a is defined by an annular ring 55. The latter is sandwiched between casing 19 and coverplate 20 and is constructed of suitable heavy material such as lead so as to backscatter beta particles.

It is noted that backscattered beta particles do not follow the laws of optical physics wherein the angle of incidence and the angle of reflection are equal. Beta particles scatter by bouncing from collisions with other nuclear particles. The angles at which they travel after collision will vary due to several factors, including the relative speeds and the heaviness of the colliding nuclear particles. Heaviness has reference to the relative atomic weight of the atoms of the material which cause the backscattering. The backscatter angle however, can be defined within mathematical limits as is set forth in an article titled: "The Scattering of α and β Particles by Matter and the Structure of the Atom," author E. Rutherford; published in the text, "Foundations of Nuclear Physics," publisher, Dove Publications, Copyright 1949. In the present instance backscattering is utilized to direct beta particles traveling through space 31 toward input beta window 31a and also to channel beta particles through the window 31a and into G-M tube face 30.

To direct beta particles toward the input window, a backscattering ring 56 is attached in a suitable manner, for example by a clamping ring 56a held by appropriate screws 21. The clamping ring 56a has an inside circumference recessed from the inside circumference of backscatter ring 56 so as to be substantially ineffective as a backscatterer for window 31a. The clamping ring 56a also provides protection for the sensing head 15 when vehicle tires pass over the unit. The ring may be suitably constructed so as to allow fluid runoff from space 31a, for example by providing slots (not shown). An inside circumferential surface 58 of ring 56 is above and in proximity with the outside circumference of beta particle input window 31a. Consequently, beta particles which may otherwise travel beyond window 31a are "backscattered" toward the window and into G-M tube 25. Though the present sensing head is operative as a film detector without the use of the ring 56, improved operation is achieved by using a backscatterer of the described general construction. The backscatter ring 56 improves operation providing for greater utilization of the longer travel path through the deposited material. Accordingly, by not depending upon deflection and stopping of beta particles by travel through the relatively shorter dimension of the film thickness, dependable results are obtained by utilizing the relatively longer dimension of film length. Therefore, relatively light substances such as frost, ice, water and the like can be accurately detected by their deflection and stopping effect upon nuclear particles.

Channeling of the beta particles through window 31a is accomplished by utilizing the backscattering properties of the ring 55 on the outside and disk 54 on the inside to bounce the beta particles into the G-M tube input face 30.

To explain how ice and films of other matter produce energization of relay 32, it is first assumed that only air is present in the space 31. Beta particles radiated from source 22 travel through space 31 above the longitudinal surface defined by disk 54 toward input window 31a. Substantially every beta particle traveling through input window 31a and entering G-M tube 25 produces a pulse output which energizes circuit 16. The D.-C. signal level is raised to where the Schmitt circuit 38 is biased so as not to energize relay 32. For one preferred embodiment of the sensing head 15 having an annular shaped space 31 with the source 22 being a centrally located washer about 0.005 of an inch and having its peripheral surface painted with strontium 90 and radiating beta particles to the input window 31a about three-quarters to one and one-half inches from the source 22 and the backscattering ring 55 about 0.015 of an inch high, a microammeter indicated a D.-C. signal of 82 microamperes. For comparison, when ice was deposited in thin layers in the space 31 the following microammeter readings were obtained:

| Layer thickness, inch | Microammeter reading, microamperes |
|---|---|
| 0.004 | 68 |
| 0.010 | 50 |
| 0.060 | 35 |

The potentiometer 53 was set so that trigger circuit 38 would be energize relay 32 when the D.-C. signal was approximately 68 microamperes whereupon the sign would give a visual indication of ice presence.

In practice it has been found that the present device can distinguish between scattered pieces of foreign matter in space 31 and films or layers of matters. Scattered pieces of foreign matter do not reduce the beta particle input at window 31a. Instead because of the backscattering between pieces of foreign matter, more beta particles reach window 31a.

To assure that a false signal due to water presence does not actuate a frost or ice warning sign, the present circuit 16 has been provided with a thermostat operated switch 60 to keep the Schmitt trigger circuit inoperative until the temperature falls below about 33 degrees Fahrenheit.

It is understandable that though a circular configuration has been shown for space 31 it is not necessary that it be such. The perimeter of space 31 need not be defined in a specific manner because the detection is accomplished by using comparative readings of beta particles, i.e., count without material in space 31 compared to the count with material in space 31. It is therefore clear that the present device is self calibrating, not being limited to a particular geometrical shape to detect thin layers of deposited material. Furthermore, though the specific circuit 16 has been shown in the preferred embodiment as responding to the sensing head pulses, it is within the skill of the art to use other types of circuits to respond to the sensing head 15 output.

While the sensing head just described has been found satisfactory and capable of detecting thin layers of ice and the like, it is sometimes desirable to employ a sensing head which can distinguish between rain, mixtures of rain and road dirt and the like which flows, and ice, frost, and the like which forms on a surface. It has been found in practice that the difference in the beta particle absorption between ice and frost as compared to a layer of water is small and not sufficiently significant to allow use of simple amplifying equipment to provide a dependable distinguishing signal. Thus an alternative embodiment of the present inventive sensing head 64 shown in FIGS. 6-8 is so constructed as to allow flowing material to run off while frost and the like forms on the surface.

The sensing head 64 has a conical shaped cover assembly 65. The assembly includes a conical outside protective cover 66 constructed of suitable beta particle permeable material such as aluminum for example, mounted on a support member 68. Material which hugs the surface will collect on cover 66 while flowing material will run off. The assembly 65 is fastened to a sensing head casing 67 by an annular collar 67a. The collar 67a is tightened so as to seal the inside of the sensing head from contamination by water and dirt.

A source of radiation 69 is provided at the apex of cover assembly 65 and includes a frusto-conical washer 70 held in place by a shaped spacer 71 fastened down by a screw 72 threadably received in support member 68. In this alternative embodiment the peripheral surface 70a of the washer is painted with an epoxy resin suspension of strontium 90. Understandably, other radioactive materials may be employed.

An input window 66 is provided in support member 68 for channeling beta particles into a G-M tube detector 25 located below and supported by member 68. The protective cover 66 allows beta particles to enter window 74 but keeps dirt and foreign matter out. Support member 68 serves the additional function of defining a longitudinal surface 75 impermeable to beta particles to describe the lower boundary of a space 76.

As was explained in connection with the first illustrative embodiment, the present embodiment also has beta particles radiating from the source 69 through the space 76 and focused toward an input window 74. With the formation of ice or like material in the space 76, beta particles which would otherwise enter window 74 are absorbed or deflected. The pulse output of the G-M tube is thereby reduced as the count of beta particles entering the tube decreases. As has been explained, the circuit 16 responds to the sensing head pulse changes to selectively operate a sign 17 for visually indicating an ice condition or the like.

A ring 78 is fastened on the surface of cover 66 by screws 79 threadably received in support member 68. The ring, constructed of suitable heavy material such as lead, is located outside of the window 74 so as to generally define the outside perimeter of space 76 and backscatter beta particles into the window 74 which would otherwise travel beyond the window. So as to allow water or other flowing material to run off, the ring 78 is segmented having spaces 79 as shown in FIG. 6.

The alternative embodiment operates in the same manner as the first embodiment except that water or other liquid material will not form as a film in space 76 but rather runs off. Ice, frost and the like which hugs the surface as it forms will deposit in space 76 and thereby reduce the number of beta particles that enter window 74. The window 74, in the present embodiment, exemplifies another geometrical configuration useful to channel beta particles once they have traveled through the space in which material is detected. In the present instance the input window 74 is several times longer than that shown in the first preferred embodiment. Because of the backscattering characteristic of beta particles colliding with heavy materials such as lead or steel, the particles can be channeled without requiring mirrored surfaces, such as are necessary for example in transmitting light. The unusual manner in which beta particles can be transmitted is not however without certain design limitations. The particles lose energy during the backscattering, thus the distance they can be channeled is limited because the particles must possess sufficient energy at the end of their trip to pulse the G-M tube 25.

FIG. 8 shows an installed sensing head 64 placed in a roadway with a perforated manhole type cover 80 to keep passing vehicles from hitting the head and also to keep large pieces of foreign material for example leaves or the like, from depositing on the sensing surface.

The sensing head can be designed for use in many installations. It can be fitted into an airplane wing, a helicopter propeller blade or other structure where the condition of a surface is to be sensed. Additionally, the sensing head may be adapted for use as a liquid level indicator by providing a responsive signal when a liquid has risen or fallen to a predetermined level. Also, it can be used to sense contamination in the air by sensing the quantity of soot and the like collecting in the predetermined space.

By using the strontium 90 as set forth in the description of the preferred embodiment, the level of radiation is maintained by the source of about 0.02 to 0.05 microcurie provides an occupational exposure of less than 0.002 rem per week. Such exposure is well below the safe limit of permissible radiation of about 0.07 rem per week as established by the International Commission on Radiation Protection (I.C.R.P.) 1959. The present invention is not restricted to using strontium 90 as other radioactive materials, for example cobalt 60 and cesium 137, can be suspended in a bonding agent such as epoxy resin and painted on a surface to provide a source of nuclear particles.

In positioning the sensing head in the road, landing strip or the like, consideration must be given to the fact that ice, frost and the like will be worn off by repeated passes of vehicle wheels over the sensing head surface. Therefore depending upon particular installations, it could be advantageous to place the sensing heads in both the usually traveled portion of the roadway and also in the usually untraveled portion and utilize responsive signals from each of the heads to operate signs.

It is clear from the description of the nuclear detector and analyzer that it performs a useful function in detecting thin films or layers of material in applications where difficulty has been experienced in constructing durable yet sensitive detectors and analyzers.

I claim as my invention:

1. The improvement of a sensing head for producing an output signal indicative of the presence of beta particle absorbing and deflecting materials within a thin layer space comprising the combination of a radiation source of beta particles, particle backscattering means positioned remote from said radiation source to define a thin layer space between said radiation source and said backscattering means, means responsive to the detection of beta particles for producing an output signal, said responsive means having an input window disposed within said thin layer space at a predetermined distance from said radiation source for receiving beta particles, and means defining a surface boundary of said thin layer space extending longitudinally between said radiation source and said receiving window, said last-named means being impervious to beta particles so as to direct said radiated beta particles through said thin layer space toward said input window.

2. The improvement of apparatus for indicating the presence of beta particle absorbing and deflecting material within a thin layer space comprising the combination of a source radiating beta particles through a predetermined thin layer space, said source being located within the plane of said thin layer space, means responsive to an input of beta particles for producing an output signal substantially proportional to the number of beta particles received at the input, said responsive means being disposed below the thin layer space and having a beta input particle window at a predetermined distance from said source, shielding means defining a lower boundary of said thin layer space extending longitudinally between said source of beta particles and said input window to enable reception of beta particles in said responsive means only through said input window, a beta particle backscatterer extending above the boundary defined by said shielding means to backscatter beta particles into said input window, and means responsive to a reduction in said output signal to indicate the presence of material in said thin layer space as the material absorbs and deflects beta particles.

3. Improved apparatus for indicating the presence of nuclear particle absorbing material within a thin layer space comprising the combination of a radiation source of nuclear particles located within the plane of the thin layer space, detecting means having an input spaced a predetermined distance from said radiation source for receiving nuclear particles and providing an output signal responsive to said received nuclear particles, means defining a nuclear particle boundary for the thin layer space extending longitudinally between said radiation source and the input in said detecting means, said last-named means being impermeable to the nuclear particles radiated through said thin layer space between said radiation source and the input of said detecting means, a nuclear particle backscatterer extending above the nuclear particle boundary defined by said last-named means to backscatter nuclear particles toward said detecting means, means responsive to said output signal to indicate the presence of material in said thin layer space, said signal output being decreased in proportion to the absorption and deflection of said nuclear particles by the material in said thin layer space, and temperature sensitive means for disabling said output signal responsive means when the temperature rises above a predetermined level.

4. The improvement of apparatus for indicating the presence of beta particle absorbing and deflecting material within a thin layer space comprising the combination of a radiation source of beta particles positioned within the plane of a predetermined thin layer space for radiating particles therethrough, means responsive to an input of beta particles for producing an output signal substantially proportional to the number of input beta particles, an input window disposed at a predetermined distance from said source and defining an outside perimeter for said thin layer space, said input window channeling beta particles to said responsive means, beta particle impervious means extending longitudinally between said source of beta particles and said input window defining a boundary for said predetermined thin layer space by enabling reception of beta particles in said responsive means only through said input window, a beta particle impervious backscatterer extending above the surface defined by said longitudinally extending beta particle impervious means and disposed so as to backscatter beta particles radiating from said source into said input window, and means responsive to reduction in said output signal to indicate the presence of material in said thin layer space as said material absorbs and deflects beta particles.

5. The improvement of apparatus for indicating the presence of beta particle absorbing and deflecting material within a thin layer space in accordance with claim 4 wherein said beta particle impervious means extends laterially between said source of beta particles and said input window is inclined downwardly from said radiation source to allow run-off of any liquid material deposited thereon.

References Cited by the Examiner
UNITED STATES PATENTS

| | | | |
|---|---|---|---|
| 2,419,454 | 4/1947 | LeClair | 340—234 |
| 2,480,846 | 9/1949 | Friedman et al. | 340—234 |
| 2,717,957 | 9/1955 | Ohlheiser | 340—234 |
| 2,943,202 | 6/1960 | Kramer | 250—83.4 |
| 2,967,937 | 1/1961 | McKay | 250—83.4 |
| 3,019,338 | 1/1962 | Monaghan et al. | 250—83.4 |

OTHER REFERENCES

Doremus, John A.: "Radioactive Snow Gage With Telemetering System," in Proceedings of the National Electronics Conference, vol. 6, 1950, pp. 518–526, TK7801.N3.

NEIL C. READ, *Primary Examiner.*

R. M. ANGUS, *Assistant Examiner.*